US008005028B2

(12) United States Patent
Itakura et al.

(10) Patent No.: US 8,005,028 B2
(45) Date of Patent: Aug. 23, 2011

(54) DATA COMMUNICATION SYSTEM, DATA TRANSMITTING DEVICE, DATA TRANSMITTING METHOD, DATA RECEIVING DEVICE, AND DATA RECEIVING METHOD

(75) Inventors: Eisaburo Itakura, Kanagawa (JP); Sei Sunahara, Kanagawa (JP); Yutaka Takahashi, Shiga (JP); Shoji Kasahara, Nara (JP); Hiroyuki Masuyama, Kyoto (JP); Yusuke Uchida, Kyoto (JP)

(73) Assignees: Sony Corporation (JP); Kyoto University (JP)

( * ) Notice: Subject to any disclaimer, the term of this patent is extended or adjusted under 35 U.S.C. 154(b) by 0 days.

(21) Appl. No.: 12/310,835

(22) PCT Filed: Aug. 30, 2007

(86) PCT No.: PCT/JP2007/066917
§ 371 (c)(1),
(2), (4) Date: Dec. 3, 2009

(87) PCT Pub. No.: WO2008/029710
PCT Pub. Date: Mar. 13, 2008

(65) Prior Publication Data
US 2010/0091801 A1 Apr. 15, 2010

(30) Foreign Application Priority Data
Sep. 6, 2006 (JP) .................................. 2006-242187

(51) Int. Cl.
*H04B 7/005* (2006.01)
(52) U.S. Cl. ..................... 370/278; 370/392; 370/395.5; 375/136; 375/135

(58) Field of Classification Search .................. None
See application file for complete search history.

(56) References Cited

U.S. PATENT DOCUMENTS

| 6,757,250 | B1 * | 6/2004 | Fayad et al. ............... 370/235.1 |
| 2003/0053419 | A1 * | 3/2003 | Kanazawa et al. ........... 370/252 |
| 2003/0126238 | A1 | 7/2003 | Kohno et al. |
| 2004/0114576 | A1 | 6/2004 | Itoh et al. |
| 2005/0022098 | A1 * | 1/2005 | Vayanos et al. ............... 714/776 |
| 2006/0159098 | A1 * | 7/2006 | Munson et al. ............... 370/394 |

FOREIGN PATENT DOCUMENTS

| JP | 06-104923 A | 4/1994 |
| JP | 2000-069557 A | 3/2000 |
| JP | 2003-152752 A | 5/2003 |
| JP | 2003-179580 A | 6/2003 |
| JP | 2003-188802 A | 7/2003 |
| JP | 2003-258777 A | 9/2003 |

* cited by examiner

*Primary Examiner* — Huy D Vu
*Assistant Examiner* — Zewdu Beyen
(74) *Attorney, Agent, or Firm* — Lerner, David, Littenberg, Krumholz & Mentlik, LLP (57) ABSTRACT

A probe transmitting section (216) in a packet receiving terminal (210) sends a probe packet to a second radio channel (320) at fixed intervals. A probe analyzing section (117) in a packet sending terminal (110) detects a burst loss on the basis of a state of reception of the probe packet. When a burst loss detection is detected, a predictive retransmission control section (118) predicts that a data packet transmitted during the period of the detected burst loss among data packets sent from a priority processing transmission buffer (115) to a first radio channel (310) is a data packet lost on a receiving side, reads the data packet from a retransmission buffer (114), and then sends the data packet to the priority processing transmission buffer (115). A real-time property can be ensured while a packet loss is overcome in a radio environment.

7 Claims, 6 Drawing Sheets

| Layer | Resolutions | J2K PACKET No. |
|---|---|---|
| L0 | 0 | 0 |
| L0 | 1 | 1 |
| L0 | 2 | 2 |
| L1 | 3 | 3 |
| L1 | 4 | 4 |
| L1 | 5 | 5 |
| L2 | 6 | 6 |
| L2 | 7 | 7 |
| L2 | 8 | 8 |

FIG. 4

| v | P | X | counter | M | payload type | SEQUENCE NUMBER |
|---|---|---|---|---|---|---|
| TIMESTAMP ||||||| 
| SYNCHRONIZATION SOURCE IDENTIFIER (SSRC) |||||||
| CONTRIBUTING SOURCE IDENTIFIER (CSRC) |||||||
| PAYLOAD (ENCODED DATA) |||||||

FIG.5

| HEAD | FORMAT | PACKET TYPE | PACKET LENGTH | |
|---|---|---|---|---|
| TRANSMISSION SYNCHRONIZATION SOURCE IDENTIFIER ETC. (RTCP) | | | | |
| TIMESTAMP | | | | |
| NUMBER OF RETRANS-MISSIONS | OPTION | NUMBER OF REPEATED DESIGNATIONS | RETRANSMISSION DESIGNATED SEQUENCE NUMBER | |
| ⋮ | ⋮ | ⋮ | ⋮ | |
| NUMBER OF RETRANS-MISSIONS | OPTION | NUMBER OF REPEATED DESIGNATIONS | RETRANSMISSION DESIGNATED SEQUENCE NUMBER | |

FIG.6

| HEAD | FORMAT | PACKET TYPE | PACKET LENGTH |
|---|---|---|---|
| TRANSMISSION SYNCHRONIZATION SOURCE IDENTIFIER ETC. (RTCP) | | | |
| SEQUENCE NUMBER | | | |
| TIMESTAMP | | | |

F I G . 8

DATA COMMUNICATION SYSTEM, DATA TRANSMITTING DEVICE, DATA TRANSMITTING METHOD, DATA RECEIVING DEVICE, AND DATA RECEIVING METHOD

CROSS-REFERENCES TO RELATED APPLICATIONS

The present application is a national phase entry under 35 U.S.C. §371 of International Application No. PCT/JP2007/066917 filed Aug. 30, 2007, published on Mar. 13, 2008 as WO 2008/029710 A1, which claims priority from Japanese Patent Application No. JP 2006-242187 filed in the Japanese Patent Office on Sep. 6, 2006, which are incorporated herein by reference.

BACKGROUND OF THE INVENTION

1. Technical Field

The present invention relates to a data communication system for transmitting a data packet from a transmitting side to a receiving side using a radio channel, a data transmitting device, a data transmitting method, a data receiving device, and a data receiving method. The present invention relates particularly to a data communication system and the like that can ensure a real-time property while overcoming a packet loss in a radio environment by transmitting a probe packet from a receiving side to a transmitting side at fixed intervals, and predicting a data packet lost on the receiving side on the basis of a state of reception of the probe packet and retransmitting the data packet to the receiving side on the transmitting side.

2. Background Art

The spread of broadband communication environments such as an ADSL (Asymmetric Digital Subscriber Line) and optical fiber and the spread of digitization of moving images in recent years have led to increased use of communication service requiring a real-time property, such as videoconferencing systems and real-time distribution of sound and moving images via the Internet. Further, in radio, which is in increasing use, real-time moving image communication service typified by wireless cameras has come into use with improvements in throughput. It is important to ensure a real-time property while overcoming a packet loss occurring on a network in such a communication.

Typical methods for QoS (Quality of Service) control in a conventional wired environment include FEC (Forward Error Correction) and ARQ (Automatic Repeat Request). FEC is a technique that adds redundancy to communication data. FEC has an excellent real-time property because a lost packet can be recovered without retransmission being performed within a correcting capability, but significantly lowers service quality when a packet loss exceeding the correcting capability occurs. On the other hand, ARQ is a technique that requests retransmission of a lost packet. Although ARQ enables recovery regardless of the number of lost packets, depending on the number of retransmissions, ARQ cannot ensure a real-time property, and similarly lowers quality.

Conventionally, as a method for compensating for disadvantages of both, there is an FEC/ARQ combination system described in Non-Patent Document 1 (Hiroyuki Tanaka and Yutaka Takahashi, "Modeling and Performance Analysis of Real-Time Hybrid FEC/ARQ": IEICE Technical Report IN2004-22, pp. 13-18, June 2004) or the like.

SUMMARY OF THE INVENTION

The technique described in Non-Patent Document 1 or the like can recover a packet loss while ensuring a real-time property. However, in a radio environment in which many packet losses are burst losses, there is a problem in that the effect of FEC is reduced and therefore the FEC/ARQ combination system does not function effectively. Moreover, because retransmission requests by ARQ to compensate therefor are made en bloc after an end of a burst loss, retransmitted packets may not arrive within an allowable delay.

It is an object of the present invention to be able to ensure a real-time property while overcoming a packet loss in a radio environment.

A concept of the present invention is a data communication system for transmitting a data packet from a data transmitting device to a data receiving device. In the data communication system, the data transmitting device includes: an encoder for performing encoding processing on transmission data, and generating the data packet storing the encoded transmission data; a data packet transmitting section configured to send the data packet generated by the encoder to a first radio channel; a retransmission control section configured to receive a retransmission request signal from a second radio channel, and control the data packet transmitting section so as to resend a predetermined data packet requested by the retransmission request signal to the first radio channel; a probe packet receiving section configured to receive a probe packet from the second radio channel; and a predictive retransmission control section configured to control the data packet transmitting section so as to resend a data packet predicted to be lost among data packets sent from the data packet transmitting section to the first radio channel to the first radio channel on a basis of a state of reception of the probe packet in the probe packet receiving section. In addition, the data receiving device includes: a data packet receiving section configured to receive the data packet from the first radio channel; a decoder for obtaining received data by performing decoding processing on the encoded data stored in the data packet received by the data packet receiving section; a retransmission request control section configured to, when the data packets received by the data packet receiving section lack a predetermined data packet necessary for the decoder to obtain the received data, send a retransmission request signal for requesting retransmission of the predetermined data packet to the second radio channel; and a probe packet transmitting section configured to send the probe packet to the second radio channel at fixed intervals.

Then, a data packet is transmitted from the data transmitting device to the data receiving device. On the transmitting side, the encoder performs encoding processing on transmission data, and further generates packet data storing the encoded transmission data by packetization processing. Then, on the transmitting side, the data packet transmitting section sends the data packet to the first radio channel.

In addition, on the transmitting side, when the retransmission control section receives a retransmission request signal from the second radio channel, the retransmission control section controls the data packet transmitting section so as to resend a predetermined data packet requested by the retransmission request signal to the first radio channel. In this case, the data packet transmitting section sends the predetermined data packet to the first radio channel.

In addition, on the transmitting side, the probe packet receiving section receives a probe packet. The predictive retransmission control section predicts a data packet lost on the receiving side among data packets sent from the data packet transmitting section to the first radio channel on a basis of a state of reception of the probe packet. For example, the predictive retransmission control section predicts that a data packet sent from the data packet transmitting section to the first radio channel during a period corresponding to a period of transmission of a probe packet not received by the probe packet receiving section is the lost data packet. Then, the predictive retransmission control section controls the data packet transmitting section so as to resend the data packet predicted to be lost to the first radio channel. In this case, the data packet transmitting section sends the data packet predicted to be lost on the receiving side to the first radio channel. As described above, the data communication system according to the present invention sends the data packet requested to be retransmitted and the data packet predicted to be lost on the receiving side from the data packet transmitting section to the first radio channel, so that a packet loss on the receiving side can be overcome. In addition, the data communication system predicts the data packet lost on the receiving side on the basis of a state of reception of the probe packet, and sends the data packet from the data packet transmitting section to the first radio channel without waiting for a retransmission request from the receiving side, so that a real-time property on the receiving side can be ensured.

For example, the data packet transmitting section has a transmission buffer for temporarily storing a data packet to be sent to the first radio channel, and the data packet stored in the transmission buffer has packet priority information. When a packet count of data packets stored in the transmission buffer exceeds a threshold value, for example, the data packet transmitting section deletes a predetermined data packet from the transmission buffer on a basis of the packet priority information.

For example, the data packet stored in the transmission buffer has packet attribute information as information indicating priority of the packet, the packet attribute information indicating that the data packet is one of a first retransmission packet to be retransmitted on a basis of the retransmission request signal, a second retransmission packet to be retransmitted on a basis of loss prediction based on the state of reception of the probe packet, and a normal packet other than the first retransmission packet and the second retransmission packet. In addition, for example, the data packet stored in the transmission buffer has layered information indicating at least a layer to which the packet belongs in layered encoding together with the packet attribute information as information indicating the priority of the packet.

For example, a degree of importance is determined on the basis of the packet attribute information, the layer and the like, and a data packet of a lowest degree of importance and data packets in a layer to which the data packet in question belongs are all deleted.

As described above, when a packet count of data packets stored in the transmission buffer exceeds a threshold value, the packet data transmitting section deletes a predetermined data packet from the transmission buffer on the basis of the packet priority information. Thus, important data packets can be preferentially delivered to the receiving side even with a limited band of the first radio channel. On the receiving side, the data packet receiving section receives the data packets from the first radio channel. Then, on the receiving side, the decoder obtains received data by performing decoding processing on encoded data stored in the received data packets.

In addition, on the receiving side, the retransmission request control section determines whether the data packets received by the data packet receiving section lack a predetermined data packet necessary for the decoder to obtain the received data. Then, the retransmission request control section sends a retransmission request signal for requesting retransmission of the missing predetermined data packet to the second radio channel. In addition, on the receiving side, the probe packet is sent to the second radio channel at fixed intervals.

As described above, the retransmission request signal for requesting retransmission of the predetermined data packet necessary for the decoder to obtain the received data is sent to the second radio channel, and the probe packet is sent to the second radio channel at fixed intervals. Thus, as described above, on the transmitting side, the data packet requested to be retransmitted and the data packet predicted to be lost on the receiving side can be sent from the data packet transmitting section to the first radio channel, so that a packet loss on the receiving side can be overcome. In addition, on the transmitting side, the data packet lost on the receiving side is predicted on the basis of the state of reception of the probe packet, and the data packet can be sent from the data packet transmitting section to the first radio channel without waiting for a retransmission request from the receiving side, so that a real-time property on the receiving side can be ensured.

According to the present invention as described above, the probe packet is transmitted from the receiving side to the transmitting side at fixed intervals, and the transmitting side predicts a data packet lost on the receiving side and retransmits the data packet to the receiving side according to the state of reception of the probe packet. It is thus possible to favorably ensure a real-time property while overcoming a packet loss in a radio environment.

Other and further technical objects of the present invention and concrete advantages obtained by the present invention will become more apparent from embodiments to be described below with reference to the drawings.

DETAILED DESCRIPTION

Best Mode for Carrying Out the Invention

Figure 1:
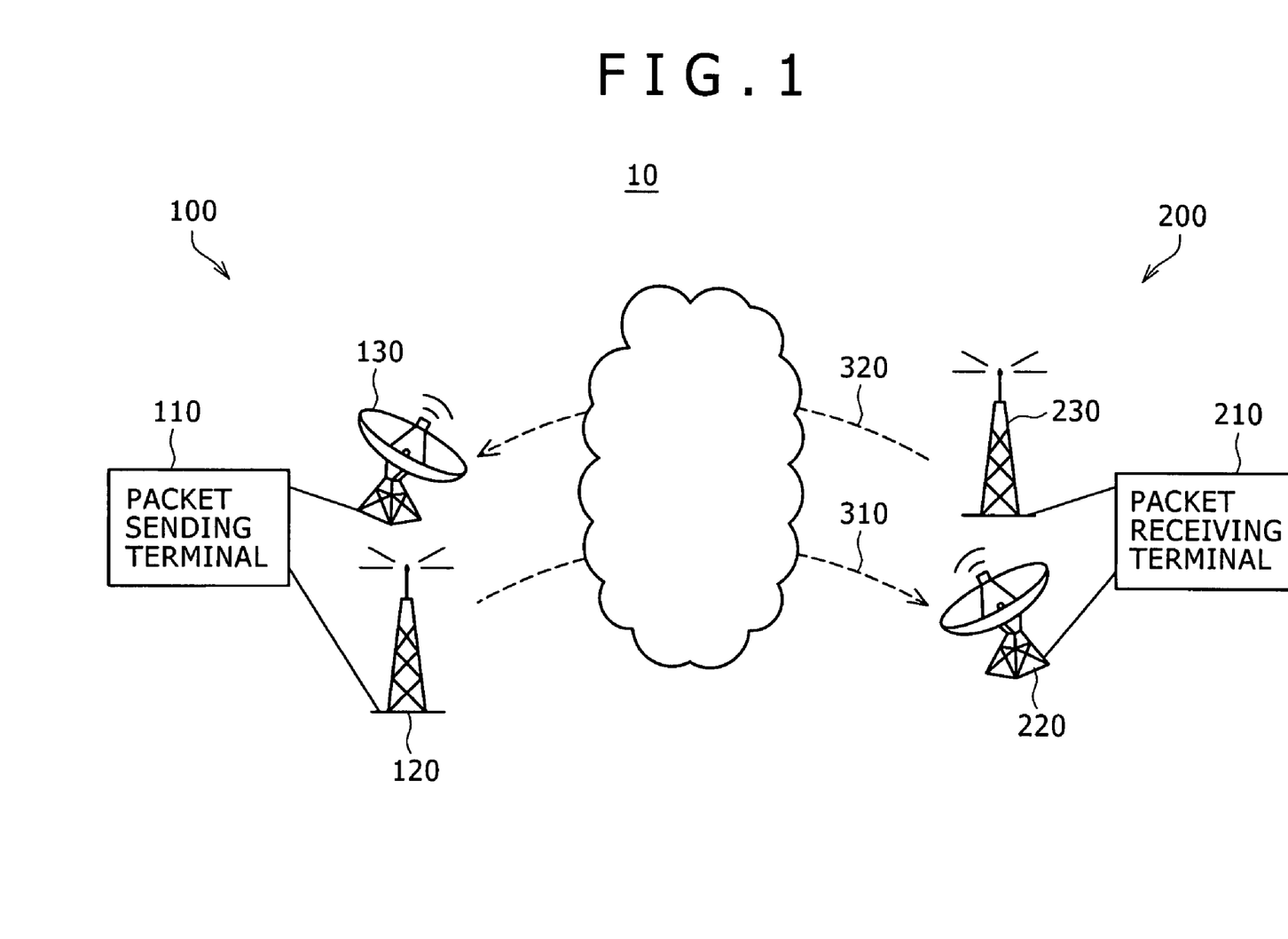
FIG. 1 is a block diagram showing a configuration of a data communication system as an embodiment.

FIG. 1 shows a configuration of a data communication system 10 as an embodiment. This data communication system 10 has a data transmitting device 100 and a data receiving device 200. The data transmitting device 100 includes a packet sending terminal 110, a radio transmitting terminal 120, and a radio receiving terminal 130. The data receiving device 200 includes a packet receiving terminal 210, a radio receiving terminal 220, and a radio transmitting terminal 230.

A data packet transferred from the packet sending terminal 110 of the data transmitting device 100 to the radio transmitting terminal 120 is received by the radio receiving terminal 220 of the data receiving device 200 by using a first radio channel 310. In addition, the packet receiving terminal 210 of the data receiving device 200 sends a probe packet to a second radio channel 320 through the radio transmitting terminal 230. The packet sending terminal 110 of the data transmitting device 100 receives the probe packet through the radio receiving terminal 130, measures a packet loss state of the second radio channel 320 according to a state of the reception, predicts that a packet loss to a similar degree also occurs on the first radio channel 310, and transmits a retransmission packet without waiting for a retransmission request from the packet receiving terminal 210 of the data receiving device 200.

Figure 2:
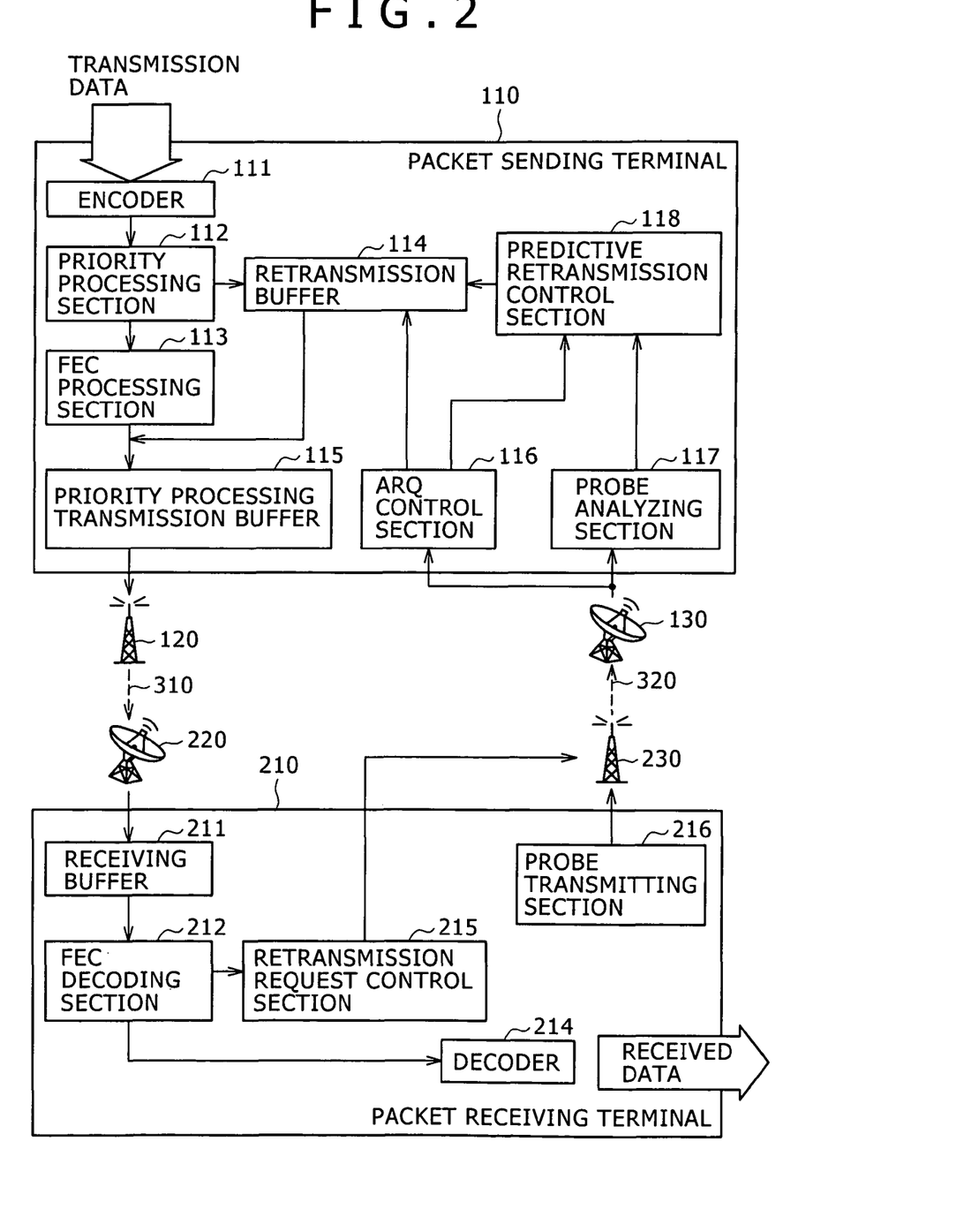
FIG. 2 is a block diagram showing a detailed configuration of a packet sending terminal of a data transmitting device and a packet receiving terminal of a data receiving device.

FIG. 2 shows a detailed configuration of the packet sending terminal 110 of the data transmitting device 100 and the packet receiving terminal 210 of the data receiving device 200.

The packet sending terminal 110 will be described first. This packet sending terminal 110 has an encoder 111, a priority processing section 112, an FEC control section 113, a retransmission buffer 114, a priority processing transmission buffer 115, an ARQ control section 116, a probe analyzing section 117, and a predictive retransmission control section 118.

The encoder 111 subjects transmission data (stream type data such as image data, audio data or the like, for example) to encoding processing, and generates a data packet storing the encoded transmission data. In the present embodiment, the encoder 111 performs layered encoding processing. Compression and decompression systems by which layered encoding can be performed include video streams based on JPEG2000 and MPEG4, for example.

MPEG4 scalably enables distribution from a low bit rate to a high bit rate. In addition, JPEG2000 based on a wavelet transform utilizes features of the wavelet transform, and enables packetization on the basis of spatial resolution or layered packetization on the basis of image quality. JPEG2000 enables layered data to be stored in a file format by a MotionJPEG2000 (Part3) standard that can handle not only still images but also moving images. The application of the above-described layered encoding processing enables simultaneous data distribution from one piece of file data to terminals having different powers.

A configuration using a technique based on a DCT (Discrete Cosine Transform) as an example of layered encoding is also possible. This method subjects, for example, image data as distribution information to DCT processing, implements layering that divides high frequencies and low frequencies by the DCT processing, and generates divided packets in a high-frequency layer and a low-frequency layer to distribute the data. The encoder 111 performs an encoding system that enables layering such as the DCT processing or the wavelet transform described above.

The encoder 111 performs progressive encoding processing in progressive order set in advance in the above-described layered encoding. Specifically, the encoder 111 performs progressive encoding processing according to various data layers, such as progressive encoding processing based on spatial resolution corresponding to the wavelet transform or the like, progressive encoding processing corresponding to a layer set for each SNR (Signal to Noise Ratio), that is, image quality, progressive encoding processing corresponding to a layer of each color component (RGB or YCbCr), or the like.

The progressive encoding is an encoding process often used for image distribution on the Internet or the like, and enables the side of a data receiving terminal to output rough image data first, and sequentially output and display fine images. For example, in the case of the progressive encoding based on spatial resolution, encoded data of high-frequency image data corresponding to a fine image is generated from encoded data of low-frequency image data corresponding to a rough image. A terminal that decodes and displays data can display a rough, general image on a display in a short time by first performing decoding and display processing on the encoded data of the low-frequency image data, and thereafter display an image that gradually becomes finer by decoding and displaying the encoded data of the high-frequency image data.

In the case of the progressive encoding based on an SNR (Signal to Noise Ratio), that is, image quality, a high SNR (high image quality) is divided from encoding data of a low SNR (low image quality), and encoding is performed. In the case of the progressive encoding based on color components (RGB or YCbCr), encoding is performed for each color component (RGB or YCbCr).

Figure 3:
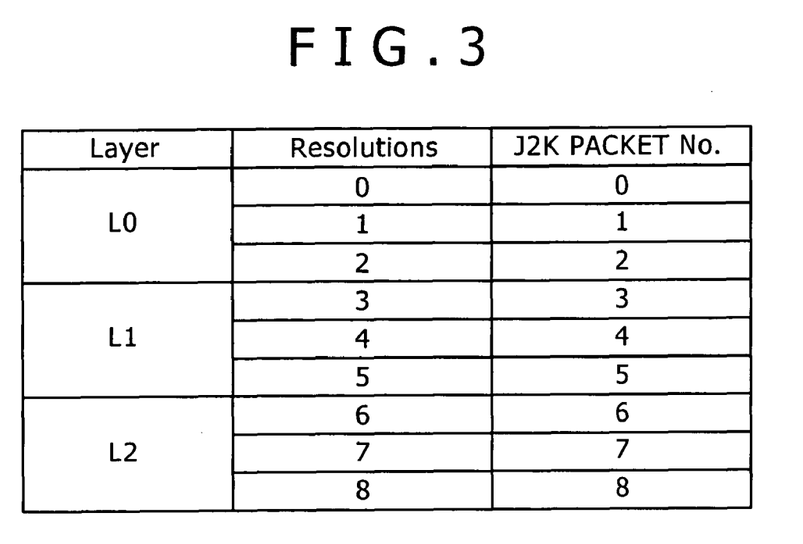
FIG. 3 is a diagram showing an example of a JPEG2000 layered structure.

FIG. 3 shows an example of a JPEG2000 layered structure. Suppose in this example that J2K packetization is performed in SNR progressive order. In this example, even when number-three and subsequent packets are not received, layer 0 can be reproduced because no packet is lost in layer 0, and when packets up to number-five are received, reproduction up to layer 1 can be performed. Thus, in JPEG2000, even if all packets are not received, images up to a reproducible layer can be reproduced. Hence, when packets are retransmitted on the basis of prediction, higher priority is given to packets in a lower layer, whereby an image skip can be prevented as much as possible.

Figure 4:
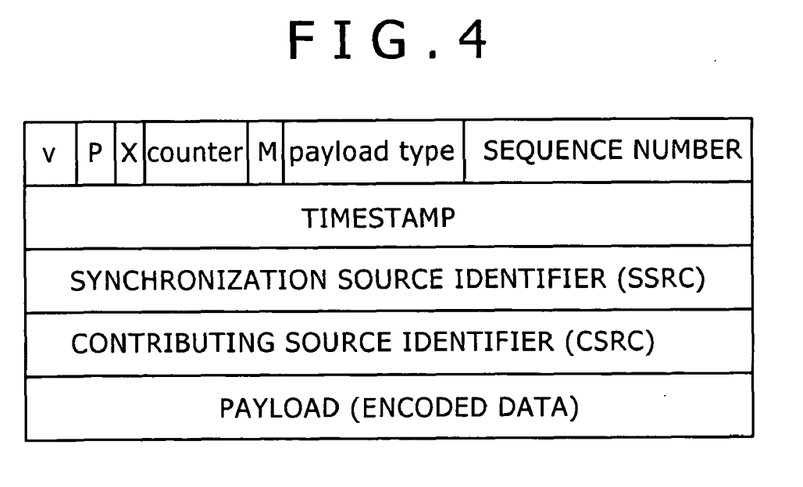
FIG. 4 is a diagram showing a configuration of a data packet (RTP packet) storing encoded data.

As described above, the encoder 111 generates a data packet storing encoded transmission data as a payload. The encoder 111 packetizes payload data by adding, for example, an RTP header to the payload data. FIG. 4 shows a configuration of an RTP packet. The RTP header has fields of a version number (v), a padding (P), presence or absence of an extension bit or an extension header (X), a transmission source count (Counter), marker information (marker bit, M), a payload type (Payload type), a sequence number, a time stamp (TIMESTAMP), a synchronization source (transmission source) identifier (SSRC), and a contributing source (transmission source) identifier (CSRC).

A data receiving side controls processing time at a time of decompressing the RTP packet on the basis of the time stamp added to the RTP header, so that the reproduction of a real-time image or sound can be controlled. Incidentally, for example, a common time stamp is set to a plurality of RTP packets storing encoded data of moving image data and belonging to one image frame, and an end packet forming each frame stores an identifying flag indicating an end in the RTP header.

Returning to FIG. 2, the priority processing section 112 adds priority information to the header of each data packet (RTP packet) generated by the encoder 111. For example, the priority information is layered information indicating a layer to which the data packet in question belongs in layered encoding. In addition, for example, suppose that the priority information includes not only the above-described layered information but also intra-layer information indicating how the data packet in question is positioned within the layer (for example, "Resolutions" in FIG. 3 or the like).

The FEC control section 113 subjects each data packet to which a priority is added by the priority processing section 112 to redundant encoding by using a Reed-Solomon (RS) code or other error correcting codes with a plurality of data packets as one FEC block. For example, when an (n, k) RS code is used, n−k redundant packets can be generated from k original packets before the redundant encoding. Incidentally, n>k.

In this case, n packets are transmitted per FEC block from the data transmitting device 100. When the data receiving device 200 can receive k packets out of the n packets, the data receiving device 200 can restore the k original packets by an RS decoding process.

The retransmission buffer 114 stores each data packet to which a priority is added by the priority processing section 112 as a data packet for retransmission.

Figure 5:
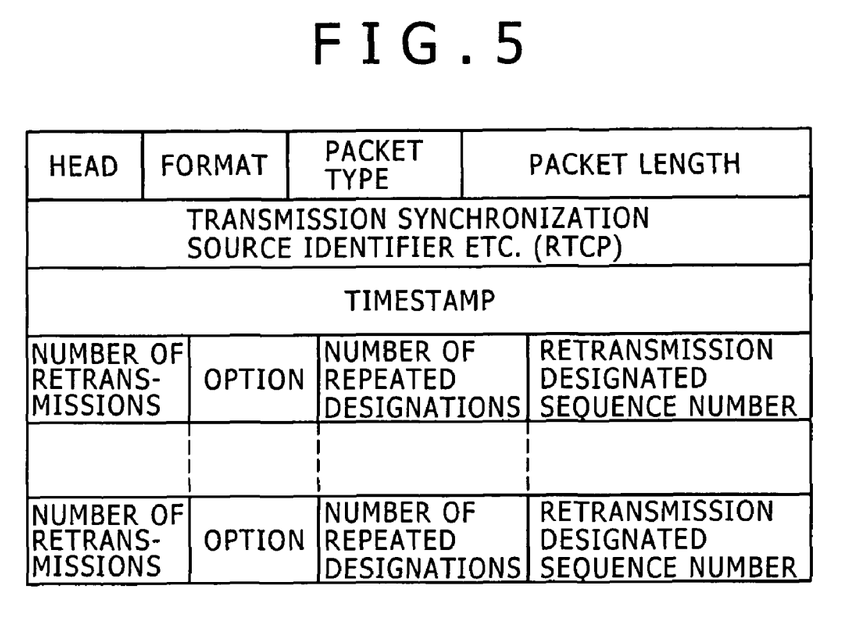
FIG. 5 is a diagram showing an example of configuration of a NACK-RTCP packet.

When the ARQ control section 116 receives a NACK (Negative Acknowledge)-RTCP packet as a retransmission request signal from the second radio channel 320 via the radio receiving terminal 130, the ARQ control section 116 reads a predetermined data packet requested by the NACK-RTCP packet from the retransmission buffer 114, and then sends the data packet to the priority processing transmission buffer 115. FIG. 5 shows a configuration of the NACK-RTCP packet. Settable in the NACK-RTCP packet are, in addition to the information of a header (HEAD), a format (FORMAT), a packet type, a packet length, a transmission synchronization source identifier (RTCP), and a time stamp (TIMESTAMP), a retransmission designated sequence number as an identifier of a packet requested to be retransmitted, and the "number of retransmissions," an "option," and the "number of repeated designations" as data corresponding to each retransmission designated sequence number. The "number of retransmissions," the "option," and the "number of repeated designations" are added as required.

The ARQ control section 116 adds, to the header of a data packet (retransmission packet) to be sent from the retransmission buffer 114 to the priority processing transmission buffer 115, packet attribute information indicating that the data packet is requested to be retransmitted by the NACK-RTCP packet. This packet attribute information constitutes information indicating priority. As will be described later, this packet attribute information sets the degree of importance of transmission of the retransmission packet higher than that of a normal data packet (normal packet) in a same layer which packet is supplied from the FEC control section 113 to the priority processing transmission buffer 115.

The probe analyzing section 117 detects whether the second radio channel 320 is in a good communication state or in a burst loss state on the basis of a state of reception of probe packets received from the second radio channel 320 by the radio receiving terminal 130.

Figure 6:
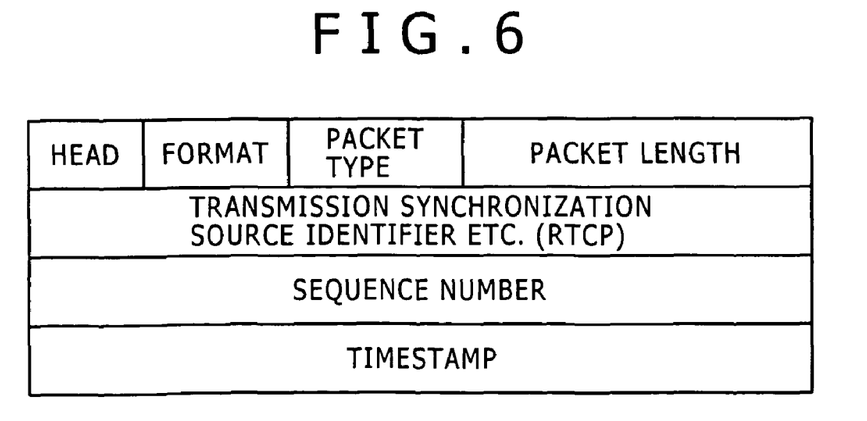
FIG. 6 is a diagram showing an example of configuration of a probe packet.

The probe packets are sent from the data receiving device 200 to the second radio channel 320 at fixed intervals. FIG. 6 shows a configuration of a probe packet. The probe packet has, in addition to the information of a header (HEAD), a format (FORMAT), a packet type, a packet length, and a transmission synchronization source identifier (RTCP), the information of a sequence number and a time stamp as probe information. Incidentally, when the receiving side terminal outputs probe packets at fixed intervals, and a delay in propagation from the receiving side terminal to the transmitting side terminal is constant, the time stamp information is not necessarily required. In addition, the sequence number is similarly information that is not necessarily required.

When the probe analyzing section 117 detects a burst loss state, the predictive retransmission control section 118 predicts data packets lost on the part of the data receiving device 200 among data packets sent from the data transmitting device 100 to the first radio channel 310, reads the predicted data packets from the retransmission buffer 114, and then sends the data packets to the priority processing transmission buffer 115. At this time, the predictive retransmission control section 118 adds, to the header of a data packet (retransmission packet) sent from the retransmission buffer 114 to the priority processing transmission buffer 115, packet attribute information indicating that a loss of the data packet is predicted from the state of reception of probe packets. This packet attribute information constitutes information indicating priority. As will be described later, this packet attribute information sets the degree of importance of transmission of the retransmission packet higher than that of a normal data packet (normal packet) in a same layer which packet is supplied from the FEC control section 113 to the priority processing transmission buffer 115.

Description will be made below of details of a process of predicting a loss on the receiving side in the probe analyzing section 117 and a retransmission process in the predictive retransmission control section 118.

Suppose that probe packet transmission intervals are Tprobe. The probe analyzing section 117 determines that a burst loss has occurred when neither of a NACK-RTCP packet and a probe packet is received during the period of a burst detection threshold value θBurst. Too small a threshold value θBurst (>Tprobe) increases the possibility of erroneously detecting that a random loss is a burst loss, whereas too large a threshold value θBurst results in a delay in burst loss detection. When a new NACK-RTCP packet or a new probe packet is received during the burst loss detection, the probe analyzing section 117 determines that the burst loss state is ended.

When the probe analyzing section 117 detects the burst loss, the predictive retransmission control section 118 reads a data packet to be retransmitted from the retransmission buffer 114 to retransmit the data packet predicted to be lost in the detected burst loss. The predictive retransmission control section 118 then sends the data packet to the priority processing transmission buffer 115.

When the burst loss is detected on the basis of the burst detection threshold value θBurst, the predictive retransmission control section 118 sets t as the time of the detection, and performs control to retransmit packets transmitted during a period from a time t-RTT/2-θBurst to a time t-RTT/2, where RTT is a round-trip propagation delay (Round Trip Time). Thereafter, as long as the probe analyzing section 117 continues the burst loss detection, at each retransmission interval TRet, the predictive retransmission control section 118 sets t as the time, and performs control to retransmit packets transmitted during a period from a time t-RTT/2-TRet to a time t-RTT/2.

Figure 7:
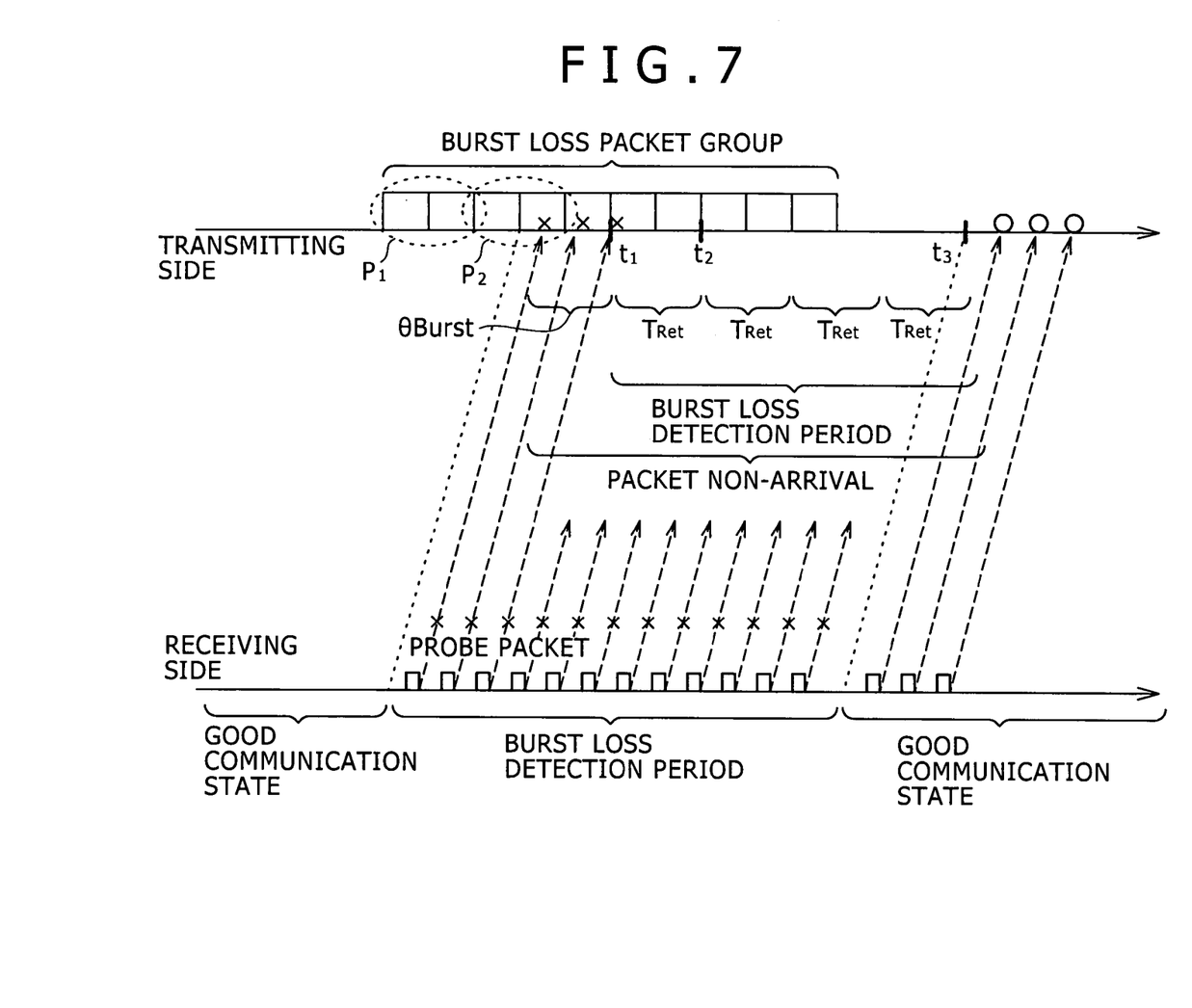
FIG. 7 is a diagram showing an example of burst loss detection and predictive retransmission.

FIG. 7 shows an example of burst loss detection and predictive retransmission. In FIG. 7, the probe analyzing section 117 first detects a burst loss at time t1. At this time, the predictive retransmission control section 118 performs control to retransmit a corresponding lost packet group P1. At time t2 after TRet, the burst loss detection has not been ended yet, and therefore the predictive retransmission control section 118 next performs control to retransmit a lost packet group P2. At time t3, a NACK-RTCP packet or a probe packet arrives from the receiving side, and thus the probe analyzing section 117 determines that the burst loss state is ended.

Figure 8:
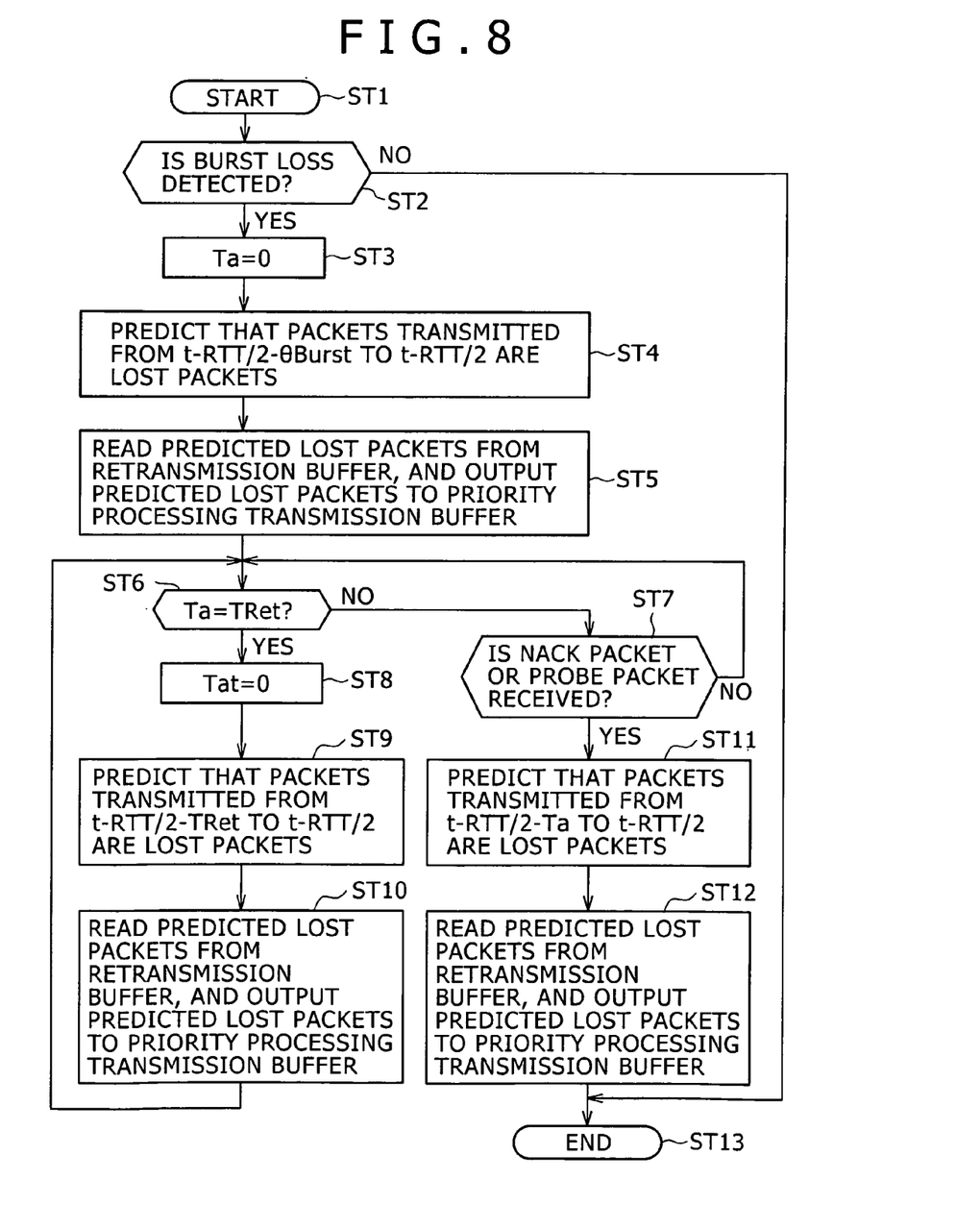
FIG. 8 is a flowchart of a predictive retransmission control process in a predictive retransmission control section.

A flowchart of FIG. 8 represents a predictive retransmission control process in the predictive retransmission control section 118. The predictive retransmission control section 118 performs the operation of this flowchart with predetermined cycles.

First, the predictive retransmission control section 118 starts the process in step ST1. The predictive retransmission control section 118 determines whether a burst loss is detected by the probe analyzing section 117 in step ST2. When no burst loss is detected, the predictive retransmission control section 118 proceeds to step ST13, where the predictive retransmission control section 118 ends the predictive retransmission control process.

When a burst loss is detected in step ST2, the predictive retransmission control section 118 sets an elapsed time Ta to zero in step ST3. Then, the predictive retransmission control section 118 in step ST4 sets t as the time of the detection, and predicts that packets transmitted during a period from a time t-RTT/2-θBurst to a time t-RTT/2 are lost packets. The predictive retransmission control section 118 in step ST5 reads the predicted lost packets from the retransmission buffer 114, and then outputs the packets to the priority processing transmission buffer 115. Next, the predictive retransmission control section 118 in step ST6 determines whether a time TRet has passed. When the time TRet has not passed, the predictive retransmission control section 118 in step ST7 determines whether a NACK packet (retransmission request signal) is received or whether a probe packet is received. When neither is received, the predictive retransmission control section 118 returns to step ST6.

When the time TRet has passed in step ST6, the predictive retransmission control section 118 sets the elapsed time Ta to zero in step ST8. Then, the predictive retransmission control section 118 in step ST9 sets t as the time of a point at which the time TRet has passed, and predicts that packets transmitted during a period from a time t-RTT/2-TRet to a time t-RTT/2 are lost packets. The predictive retransmission control section 118 in step ST10 reads the predicted lost packets from the retransmission buffer 114, and then outputs the packets to the priority processing transmission buffer 115. Then the predictive retransmission control section 118 returns to step ST6.

In addition, when a NACK packet or a probe packet is received in step ST7, the predictive retransmission control section 118 in step ST11 sets t as the time of a point of the reception, and predicts that packets transmitted during a period from a time t-RTT/2-Ta to a time t-RTT/2 are lost packets when a probe packet is received. The predictive retransmission control section 118 in step ST12 reads the predicted lost packets from the retransmission buffer 114, and then outputs the packets to the priority processing transmission buffer 115. When a NACK packet is received, the predictive retransmission control section 118 takes a requested retransmission packet indicated by information within the NACK packet from the time t-RTT/2-Ta as a lost packet. The predictive retransmission control section 118 in step ST12 reads the predicted lost packet from the retransmission buffer 114, and then outputs the packet to the priority processing transmission buffer 115. Then, the predictive retransmission control section 118 proceeds to step ST13, where the predictive retransmission control process is ended.

In addition, returning to FIG. 2, the priority processing transmission buffer 115 temporarily stores data packets and redundant packets of each FEC block output from the FEC control section 113 and data packets read from the retransmission buffer 114 under control of the ARQ control section 116 and the predictive retransmission control section 118, selects packets to be transmitted on the basis of priority, and then sends the packets to be transmitted to the first radio channel 310 via the radio transmitting terminal 120. The priority processing transmission buffer 115 forms a data packet transmitting section.

Description will be made of buffer management (a process of selecting packets to be transmitted) in the priority processing transmission buffer 115.

The predictive retransmission performed under control of the above-described predictive retransmission control section 118 may cause a situation in which excess data packets are temporarily stored in the priority processing transmission buffer 115 and thus packets do not reach the receiving terminal within an allowable delay. In this case, for efficient packet transmission, buffer management is performed in which the degree of importance of a packet is defined and packets of relatively low importance within the buffer are deleted.

First, the degree of importance Pvalue of a packet is defined by the following equation.

$$P\text{value}=PL\text{value}(n)+PS\text{value}(u) \quad (1)$$

where PLvalue(n) is a degree of importance determined on the basis of priority information related to the layered encoding, the priority information being added to each data packet in the priority processing section 112 as described above, and PLvalue(n), for example, assumes a larger value as the layer number n of the packet is decreased, and PSvalue(u) is a degree of importance determined on the basis of a packet attribute u as the above-described priority information, and PSvalue(u) has a value determined according to whether the attribute u of the packet indicates a normal packet (u=0), a predictive retransmission packet (u=1), or a retransmission packet (u=2) in response to a NACK. The attribute of the latter represents a lower ratio of band use to a degree of contribution to image quality, and for example the attribute of the latter has a larger value.

While the number of packets within the buffer is larger than a buffer threshold value ABPacket, at buffer check intervals TBCheck, on the basis of Pvalue, the priority processing transmission buffer 115 repeats (1) a search for a packet having a smallest Pvalue within the transmission buffer, and (2) deletion of all packets of a layer to which the packet belongs from the transmission buffer.

The packet receiving terminal 210 will next be described with reference to FIG. 2. This packet receiving terminal 210 has a receiving buffer 211, an FEC decoding section 212, a decoder 214, a retransmission request control section 215, and a probe transmitting section 216.

The receiving buffer 211 retains a data packet received from the first radio channel 310 by the radio receiving terminal 220. The FEC decoding section 212 performs decoding processing when there is a loss in packets retained by the receiving buffer 211. When there is no loss, or when there is a loss but necessary packets are obtained within a reproduction time by the decoding processing, the decoder 214 obtains received data by performing decoding processing on the necessary packets. When even the decoding processing of the FEC decoding section 212 cannot supply a lack of predetermined data packets necessary to obtain the received data by the above-described decoder 214, the retransmission request control section 215 sends a NACK-RTCP packet requesting the retransmission of the predetermined data packets to the second radio channel 320 via the radio transmitting terminal 230. The probe transmitting section 216 sends the above-described probe packet to the second radio channel 320 via the radio transmitting terminal 230 at fixed intervals Tprobe.

Description will be made of the operation of the packet sending terminal 110 and the packet receiving terminal 210 shown in FIG. 2.

Transmission data (stream type data such as image data or audio data, for example) is supplied to the encoder 111 in the packet sending terminal 110. The encoder 111 performs layered encoding processing on the transmission data, and generates a data packet (RTP packet) storing the encoded transmission data as a payload.

The data packet generated by the encoder 111 is supplied to the priority processing section 112. The priority processing section 112 adds a priority corresponding to a layer of the layered encoding (the lower the layer number, the higher the priority) to the header of each data packet (RTP packet) generated by the encoder 111. The data packet to which the priority is added is supplied to the retransmission buffer 114 to be retained therein, and is supplied to the FEC control section 113.

The FEC control section 113 integrates a plurality of data packets into one FEC block, and performs redundant encoding by using an error correcting code such as a Reed-Solomon (RS) code or the like for each FEC block. The packets (data packets and redundant packets) of each FEC block output from the FEC control section 113 are supplied to the priority processing transmission buffer 115.

In addition, the probe packet is sent from the probe transmitting section 216 in the packet receiving terminal 210 to the second radio channel 320 via the radio transmitting terminal 230 at fixed intervals. The probe analyzing section 117 in the packet sending terminal 110 detects whether the second radio channel 320 is in a good communication state or in a burst loss state on the basis of a state of reception of the probe packet received from the second radio channel 320 by the radio receiving terminal 130.

When the probe analyzing section 117 detects a burst loss state, the predictive retransmission control section 118 predicts data packets lost on the part of the data receiving device 200 among data packets sent from the data transmitting device 100 to the first radio channel 310. Then, under control of the predictive retransmission control section 118, the predicted data packets are read from the retransmission buffer 114, and then sent to the priority processing transmission buffer 115. In this case, the headers of the data packets (retransmission packets) sent from the retransmission buffer 114 to the priority processing transmission buffer 115 have packet attribute information (priority information) added thereto, the packet attribute information indicating that the data packets are predicted to be lost from the state of reception of the probe packet.

In addition, when the ARQ control section 116 receives a NACK (Negative Acknowledge)-RTCP packet as a retransmission request signal from the second radio channel 320 via the radio receiving terminal 130, under control of the ARQ control section 116, a predetermined data packet requested by the NACK-RTCP packet is read from the retransmission buffer 114, and then sent to the priority processing transmission buffer 115. The header of the data packet (retransmission packet) sent from the retransmission buffer 114 to the priority processing transmission buffer 115 has packet attribute information (priority information) added thereto, the packet attribute information indicating that the data packet is requested to be retransmitted by the NACK-RTCP packet.

The priority processing transmission buffer 115 temporarily stores data packets and redundant packets of each FEC block output from the FEC control section 113 and data packets read from the retransmission buffer 114 under control of the ARQ control section 116 and the predictive retransmission control section 118, and selects a packet to be transmitted according to a degree of importance determined on the basis of priority (priority corresponding to a layer and priority corresponding to a packet attribute). Then, the packet to be transmitted is sent from the priority processing transmission buffer 115 to the first radio channel 310 via the radio transmitting terminal 120.

The receiving buffer 211 in the packet receiving terminal 210 retains the data packet received from the first radio channel 310 by the radio receiving terminal 220. The FEC decoding section 212 performs decoding processing by using redundant packets when there is a loss in packets retained by the receiving buffer 211. When there is no loss, or when there is a loss but necessary packets are obtained within a reproduction time by the decoding processing, the decoder 214 obtains received data (stream type data such as image data or audio data, for example) by performing decoding processing on the necessary packets.

When even the decoding processing of the FEC decoding section 212 cannot supply a lack of predetermined data packets necessary to obtain the received data by the above-described decoder 214, the retransmission request control section 215 in the packet receiving terminal 210 sends a NACK-RTCP packet requesting the retransmission of the predetermined data packets to the second radio channel 320 via the radio transmitting terminal 230.

In the embodiment described above, the NACK-RTCP packet (retransmission request signal) requesting the retransmission of the predetermined data packets necessary to obtain the received data by the decoder 214 in the packet receiving terminal 210 is sent to the second radio channel 320, and the probe packet is sent from the probe transmitting section 216 in the packet receiving terminal 210 to the second radio channel 320 at fixed intervals.

Thus, according to the above-described embodiment, the packet sending terminal 110 can send a data packet requested to be retransmitted and a data packet predicted to be lost on the receiving side from the priority processing transmission buffer 115 to the first radio channel 310, so that a packet loss on the receiving side can be overcome. In addition, according to the above-described embodiment, the predictive retransmission control section 118 in the packet receiving terminal 210 can predict a data packet lost on the receiving side on the basis of a state of reception of probe packets, and send the data packet predicted to be lost on the receiving side from the priority processing transmission buffer 115 to the first radio channel 310 without waiting for a NACK-RTCP packet (retransmission request signal) from the receiving side, so that a real-time property on the receiving side can be ensured.

In addition, in the above-described embodiment, when a packet count of data packets stored in the transmission buffer exceeds a threshold value, the priority processing transmission buffer 115 in the packet sending terminal 110 deletes predetermined data packets, for example, a data packet of lowest importance and data packets in a layer to which the data packet in question belongs, from the transmission buffer on the basis of information (packet attribute information and layered information) on the priority of packets. Thus, according to the above-described embodiment, important data packets can be preferentially delivered to the receiving side even with a limited band of the first radio channel 310.

Incidentally, each functional section of the packet sending terminal 110 and the packet receiving terminal 210 in the above-described embodiment can be implemented by both of hardware and software. When each functional section is implemented by software, a computer performs the processing of each functional section on the basis of a program stored in a ROM or on a hard disk.

In addition, while the above-described embodiment illustrates a combination of the ARQ system (automatic retransmission system) and the FEC system (forward error correcting encoding system), the present invention is similarly applicable to data communication systems adopting only the ARQ system.

INDUSTRIAL APPLICABILITY

The present invention can ensure a real-time property while overcoming a packet loss in a radio environment. The present invention is applicable to data communication systems for transmitting data packets of stream type data such as image data, audio data or the like from a transmitting side to a receiving side by using a radio channel, and the like.

The invention claimed is:

1. A data communication system, comprising:
a data receiving device;
a data transmitting device for transmitting a data packet to said data receiving device;
said data transmitting device including:
   an encoder configured to perform encoding processing on transmission data, and to generate said data packet storing the encoded transmission data,
   a data packet transmitting section configured to send said data packet generated by said encoder to a first radio channel,
   a retransmission control section configured to receive a retransmission request signal from a second radio channel, and to control said data packet transmitting section so as to resend a predetermined data packet requested by the retransmission request signal to said first radio channel,
   a probe packet receiving section configured to receive a probe packet from said second radio channel, and
   a predictive retransmission control section configured to control said data packet transmitting section so as to resend to said first radio channel a data packet predicted to be lost among data packets sent from said data packet transmitting section to said first radio channel based on a state of reception of said probe packet in said probe packet receiving section;
said data receiving device including:
   a data packet receiving section configured to receive said data packet from said first radio channel,
   a decoder for obtaining received data by performing decoding processing on the encoded data stored in the received data packet,
   a retransmission request control section configured to, when the received data packets lack a predetermined data packet necessary for said decoder to obtain said received data, send a retransmission request signal for requesting retransmission of the predetermined data packet to said second radio channel, and
   a probe packet transmitting section configured to send said probe packet to said second radio channel at fixed intervals;
wherein said data packet transmitting section further includes a transmission buffer for temporarily storing a data packet to be sent to said first radio channel,
said data packet stored in said transmission buffer has packet priority information and packet attribute information,
a packet count of data packets stored in the transmission buffer is checked in each buffer check interval,
said data packet transmitting section deletes all packets of a layer having a smallest value of packet priority information within said transmission buffer when a packet count of data packets stored in said transmission buffer exceeds a threshold value,
said packet priority information is calculated by adding a first importance level determined based on priority information in the encoding process to a second importance level determined based on the packet attribute information, and
said packet attribute information indicates that said data packet is one of a first retransmission packet to be retransmitted based on said retransmission request signal, a second retransmission packet to be retransmitted based on loss prediction based on the state of reception of said probe packet, and a normal packet other than the first retransmission packet and the second retransmission packet.

2. A data transmitting device, comprising:
an encoder configured to perform encoding processing on transmission data and to generate a data packet storing the encoded transmission data;
a data packet transmitting section configured to send said data packet generated by said encoder to a first radio channel;
a retransmission control section configured to receive a retransmission request signal from a second radio channel, and to control said data packet transmitting section so as to resend a predetermined data packet requested by the retransmission request signal to said first radio channel;
a probe packet receiving section configured to receive a probe packet from said second radio channel; and
a predictive retransmission control section configured to control said data packet transmitting section to resend to said first radio channel a data packet predicted to be lost among data packets sent from said data packet transmitting section to said first radio channel based on a state of reception of said probe packet in said probe packet receiving section;
wherein said data packet transmitting section has a transmission buffer for temporarily storing a data packet to be sent to said first radio channel,
said data packet stored in said transmission buffer has packet priority information and packet attribute information,
a packet count of data packets stored in the transmission buffer is checked in each buffer check interval,
said data packet transmitting section deletes all packets of a layer having a smallest value of packet priority information within said transmission buffer when a packet count of data packets stored in said transmission buffer exceeds a threshold value,
said packet priority information is calculated by adding a first importance level determined based on priority information in the encoding process to a second importance level determined based on the packet attribute information, and
said packet attribute information indicates that said data packet is one of a first retransmission packet to be retransmitted based on said retransmission request signal, a second retransmission packet to be retransmitted based on loss prediction based on the state of reception of said probe packet, and a normal packet other than the first retransmission packet and the second retransmission packet.

3. The data transmitting device according to claim 2, wherein said encoder performs layered encoding processing on said transmission data, and said data packet has layered information indicating at least a layer to which the packet belongs in said layered encoding together with said packet attribute information as information indicating the priority of said packet.

4. The data transmitting device according to claim 2, wherein said predictive retransmission control section predicts that a data packet sent from said data packet transmitting section to said first radio channel during a period corresponding to a period of transmission of said probe packet not received by said probe packet receiving section is lost.

5. A data transmitting method, comprising:
an encoding step of performing encoding processing on transmission data, and generating a data packet storing the encoded transmission data;
a data packet transmitting step of sending said data packet generated in said encoding step to a first radio channel;
a retransmission control step of receiving a retransmission request signal from a second radio channel, and controlling said data packet transmitting step so as to resend a predetermined data packet requested by the retransmission request signal to said first radio channel;
a probe packet receiving step of receiving a probe packet from said second radio channel; and
a predictive retransmission control step of controlling said data packet transmitting step so as to resend to said first radio channel a data packet predicted to be lost among data packets sent to said first radio channel in said data packet transmitting step based on a state of reception of said probe packet in said probe packet receiving step;
wherein said data packet transmitting step includes:
a step of temporarily storing a data packet to be sent to said first radio channel,
said temporarily stored data packet has packet priority information and packet attribute information,
a step of checking a packet count of stored data packets in each buffer check interval,
a step of deleting all packets of a layer having a smallest value of packet priority information within said transmission buffer when a packet count of data packets stored in said transmission buffer exceeds a threshold value,
a step of calculating said packet priority information by adding a first importance level determined based on priority information in the encoding process to a second importance level determined based on the packet attribute information, and
said packet attribute information indicating that said data packet is one of a first retransmission packet to be retransmitted based on said retransmission request signal, a second retransmission packet to be retransmitted based on loss prediction based on the state of reception of said probe packet, and a normal packet other than the first retransmission packet and the second retransmission packet.

6. The data transmitting method according to claim 5, wherein in said encoding step, layered encoding processing is performed on said transmission data; and said data packet has layered information indicating at least a layer to which the packet belongs in said layered encoding together with said packet attribute information as information indicating the priority of said packet.

7. The data transmitting method according to claim 5, wherein in said predictive control step, a data packet sent from said data packet transmitting section to said first radio channel during a period corresponding to a period of transmission of said probe packet not received in said probe packet receiving step is predicted to be lost.

* * * * *